United States Patent
Crea et al.

(10) Patent No.: US 6,936,287 B1
(45) Date of Patent: *Aug. 30, 2005

(54) WATER-SOLUBLE EXTRACT FROM OLIVES

(75) Inventors: Roberto Crea, Hayward, CA (US); Luciano Caglioti, Rome (IT)

(73) Assignee: CreAgri, Inc., Hayward, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/743,691

(22) PCT Filed: Jul. 22, 1999

(86) PCT No.: PCT/US99/16549

§ 371 (c)(1),
(2), (4) Date: May 20, 2004

(87) PCT Pub. No.: WO00/04794

PCT Pub. Date: Feb. 3, 2000

Related U.S. Application Data

(60) Provisional application No. 60/093,818, filed on Jul. 23, 1998.

(51) Int. Cl.$^7$ .............................................. A01N 65/00
(52) U.S. Cl. ...................................................... 424/769
(58) Field of Search ........................................ 424/769

(56) References Cited

U.S. PATENT DOCUMENTS 6,197,308 B1 * 3/2001 Crea et al. .................. 424/769

* cited by examiner

*Primary Examiner*—Herbert J. Lilling
(74) *Attorney, Agent, or Firm*—Peter J. Dehlinger; Perkins Coie LLP

(57) ABSTRACT

The invention provides olive-derived vegetation water substantially free of monophenolic compounds (e.g., tyrosol and its derivatives) from olive pits. According to one aspect of the invention, the pits or seeds are removed from the olives prior to pressing. The pitless pulp or meat is then pressed to obtain a liquid-phase mixture including olive oil, vegetation water, and solid by-products. The vegetation water is separated from the rest of the liquid-phase mixture and collected. The vegetation water is useful as a source of oleuropein.

12 Claims, No Drawings

WATER-SOLUBLE EXTRACT FROM OLIVES

This application claims the benefit of Provisional Application Ser. No. 60/093,818, filed Jul. 23, 1998.

FIELD OF THE INVENTION

This invention relates to a polyphenolic compound present in olive plants known as oleuropein. Particularly, the invention provides an olive extract containing oleuropein, substantially free of undesirable monophenolic compounds, and a method of obtaining the same.

REFERENCES

Aziz, N. H., et al., *Microbios.* 93(374): 43 (1998);
de la Puerta, et al., *R. Biochem. Pharmacol.* 57(4): 445 (1999);
Koutsoumanis, K., et al, *J. Appl. Microbiol.* 84(6): 981 (1998);
Tassou, C. C., et al., *Lett. Appl. Microbiol.* 20(2): 120 (1995);
Tranter, H. S., et al., *J. Appl. Bacterial.* 74(3): 253 (1993);
Visioli, F., et al., *Biochem. Biophys. Res. Commun.* 247(1): 60 (1998a);
Visioli, F., et al., *Life Sci.* 62(6): 541 (1998b).

BACKGROUND OF THE INVENTION

The olive tree and other members of the family Oleaceae have been documented as a source of medicinal substances since biblical times. Many researchers have studied the cocktail of phytogenic substances produced by the olive and other members of this family. One compound that has received particular attention from the research community is a glucoside known as oleuropein. A number of scientific studies have shown this compound to have certain anti-viral, anti-fungal, and anti-bacterial properties (Koutsoumanis; et al., 1998; Aziz, et al., 1998; Tranter, et al., 1993; Tassou, et al., 1995), anti-oxidant properties (de la Puerta, et al., 1999; Visiola, 1998a), and anti-inflammatory properties (Visioli, et al., 1998b). Interest in natural anti-oxidants is increasing because of the growing body of evidence indicating the involvement of oxygen-derived free radicals in several pathologic processes, such as cancer and atherosclerosis.

Not surprisingly, the market for oleuropein is quite substantial. Dietary supplements containing oleuropein are readily obtainable via mail-order catalogs and the internet. Currently, most of the oleuropein commercially available to consumers is derived from olive leaves. To date, the fruit of the olive plant, which is rich in oleuropein, has largely been ignored as a source of oleuropein due to certain problems associated with the production of olive oil, discussed below.

Conventionally, olive oil production involves crushing olives, including the pits, to produce a thick paste. During this procedure, the crushed olives are continuously washed with water, a process known as "malaxation." The paste is then mechanically pressed to squeeze out the oil content. In addition to providing olive oil, the pressing also squeezes out the paste's water content. Such washing and pressing steps yield a considerable amount of water, referred to as "vegetation water."

Both the pit and the pulp of olives are rich in water-soluble, phenolic compounds. Such compounds are extracted from olives during malaxation, according to their partition coefficients, and end up in the vegetation water. This explains why various polyphenolic compounds, such as oleuropein and its derivatives, produced in olive pulp, can be found in abundance in vegetation waters. Similarly, a number of monophenolic compounds, such as tyrosol and its derivatives, produced in olive pits, are also abundant in vegetation waters.

Oleuropein and its derivatives are readily degraded into breakdown products (e.g., upon exposure to air/oxygen, certain enzymes or bacteria) that are substantially non-polluting and non-toxic. Tyrosol and its derivatives, on the other hand, are substantially resistant to air/oxygen, bacterial and enzymatic degradation and are of a highly polluting nature. Unfortunately, current technology does not permit the isolation of oleuropein and its derivatives from such highly polluting monophenolic compounds in vegetation waters except through time-consuming and expensive separation processes. For these reasons, vegetation waters are currently treated as waste and are discarded without realizing their content of oleuropein.

SUMMARY OF THE INVENTION

One aspect of the present invention provides a method of producing vegetation water from olives, the vegetation water containing oleuropein substantially free of monophenolic compounds from olive pits, comprising the steps of:
separating olive pits from olives to obtain a pitless olive pulp;
pressing the pitless olive pulp to obtain a liquid-phase mixture including water, oil, and olive pulp components;
separating the water component from the oil and olive pulp components of the liquid-phase mixture to obtain a water component substantially free of oil and olive pulp; and,
collecting the separated water component.

According to one related embodiment, moisture is removed from the separated water component to obtain an increased concentration of oleuropein.

According to another related embodiment, the separated water component is dried to obtain a powder containing oleuropein. The powder containing oleuropein may be encapsulated into a gelatin capsule.

Another aspect of the invention provides a composition, prepared according to the method of the invention, which comprises oleuropein substantially free of monophenolic compounds from olive pits.

A further aspect of the invention provides a method for obtaining oleuropein from olives, substantially free of monophenolic compounds from olive pits, which comprises the steps of:
separating olive pits from olives to obtain a pitless olive pulp;
extracting the pitless olive pulp with an aqueous or aqueous-alcoholic solvent to produce a crude mixture of polyphenolic compounds in the extract; and,
removing the solvent from the extract.

A related embodiment further includes the step of chromatographing the extract on a column; and collecting fractions from the column which contain oleuropein.

An additional aspect of the invention provides a dietary supplement comprising extract of olives containing oleuropein substantially free of monophenolic compounds from olive pits.

According to one related embodiment, the extract is an aqueous or aqueous-alcoholic extract. The extract may have a reduced moisture content to provide a concentrated liquid.

Or, the extract may be dried to provide a powder. The extract may be in the form of a tablet, capsule, pill, or confection food additive.

These and other features and advantages of the present invention will become clear from the following description.

DETAILED DESCRIPTION OF THE INVENTION

One aspect of the present invention provides olive-derived vegetation water that is substantially free of monophenolic compounds from olive pits. To obtain such vegetation water, the invention provides for the removal of the pits or seeds from the olives prior to pressing. The pitless pulp or meat is then pressed to obtain a liquid-phase mixture including olive oil, vegetation water, and solid by-products. Thereafter, the vegetation water is separated from the rest of the liquid-phase mixture and collected.

It should be appreciated the vegetation water produced in this manner is substantially free of compounds that are found primarily in olive pits, such as tyrosol and other highly polluting, monophenolic compounds. The vegetation water thus obtained may be used, for example, in a variety of ways not amenable to conventional vegetation water. For example, vegetation water obtained by the method of the present invention can be used: (i) as a natural anti-bacterial, anti-viral and/or fungicidal product for agricultural and/or pest control applications, (ii) as a raw material for the production of oleuropein and other anti-oxidants for a variety of medical purposes (e.g., holistic medicine), and (iii) as a therapeutic and/or an anti-oxidant beverage for a variety of health purposes.

According to one embodiment, a batch of olives is processed to remove the pit from each fruit. The pitless pulp is then mechanically pressed to yield a liquid-phase mixture including olive oil, vegetation waters, and solid by-products. The solid by-products are substantially removed from the liquid-phase mixture by filtration and/or centrifugation. Next, the oil and aqueous fractions are then allowed to segregate. The aqueous phase is then decanted and saved for further use.

In one embodiment, the pitless olive pulp is mixed with water or an alcohol/water solution to produce an extract substantially free of chemicals associated with the olive pits or seeds, such as tyrosol and its derivatives.

The vegetation water or extract may be concentrated by distillation under vacuum. The concentrate may be dried by spray drying or oven drying under vacuum to obtain a powder containing oleuropein. It may be desirable to conduct such steps at a temperature no greater than about 88 degrees Celsius to avoid degradation of the glucoside. The oleuropein can then be purified, for example, by chromatographic separation procedures. The oleuropein content may be tested by standard thin layer chromatography and high-pressure liquid chromatography methods.

Techniques suitable for concentrating and/or isolating oleuropein from aqueous and aqueous-alcoholic solutions are taught, for example, in U.S. Pat. No. 5,714,150, expressly incorporated herein by reference.

The olives processed according to the method disclosed herein may be pitted by any suitable means. The pits may be separated from the pulp manually or in an automated manner. Preferably, such means should be capable of segregating the pits without breaking them, which might otherwise cause sharp pieces to become embedded in the olive meat.

For purposes of commercial production, it may be desirable to automate various aspects of the invention. In this regard, one embodiment contemplates the use of an apparatus as disclosed in U.S. Pat. Nos. 4,452,744, 4,522,119 and 4,370,274, each to Finch et al., and each expressly incorporated herein by reference. Briefly, Finch et al. teach an apparatus for recovering olive oil from olives. Initially, olives are fed to a pulper that separates the olive pits from the olives to obtain a pitless olive meat. The meat is then taken up by an extraction screw that subjects the meat to an extraction pressure sufficient to withdraw a liquid phase, comprising oil, water and a minor proportion of olive pulp. The liquid phase is collected in a bin and then sent to a clarifying centrifuge that separates the pulp from the liquid phase to obtain a mixture comprising olive oil and water. A purifying centrifuge then separates the water and a small proportion of solid matter from the mixture to obtain an olive oil, substantially free of water, that is collected in a tank. According to Finch et al., the water is put to a disposal means such as a sewer. The present invention, in sharp contrast, provides for the collection, saving and use of the vegetation waters.

Additional devices that may be used in practicing the present invention are disclosed in Italian Patent Nos. 1276576 and 1278025, each expressly incorporated herein by reference. As above, these devices can be used to separate the pulp from the pits prior to processing of the crushed olive pulp into oil, water, and solid residues.

As previously described, a number of uses are contemplated for vegetation waters obtained in accordance with the method of this invention. In one exemplary embodiment, the vegetation water, or a concentrate or isolate thereof, is administered to a mammalian subject, such as a person desirous of one or more of the benefits associated with oleuropein.

The oleuropein obtained by the method of the invention can be administered orally or parenterally. Oral dosage forms can be in a solid or liquid form. Such dosage forms can be formulated from purified oleuropein or they can be formulated from aqueous or aqueous-alcoholic extracts. Regarding the latter, aqueous or aqueous-alcoholic (e.g., water-methanol or water-ethanol) extracts can be spray-dried to provide a dry powder that can be formulated into oral dosage forms with other pharmaceutically acceptable carriers.

The solid oral dosage form compositions in accordance with this invention are prepared in a manner well known in the pharmaceutical arts, and comprise oleuropein in combination with at least one pharmaceutically acceptable carrier. In making such compositions, oleuropein, either in substantially pure form or as a component of a raw distillate or extract, are usually mixed, diluted or enclosed with a carrier. The carrier can be in a solid form, semi-solid or liquid material which acts as a vehicle, carrier or medium for the active ingredient. Alternatively, the carrier can be in the form of a capsule or other container to facilitate oral administration. Thus, the solid oral dosage forms for administration in accordance with the present invention can be in the form of tablets, pills, powders or soft or hard gelatin capsules.

Alternatively, the oleuropein obtained in accordance with this invention for oral administration can be in liquid form wherein the pharmaceutically acceptable carrier is water or an aqueous-alcoholic medium.

The compositions for administration in the present invention can also be formulated with other common pharmaceutically acceptable excipients, including lactose, dextrose, sucrose, sorbitol, mannitol, starches, gums, calcium silicate, microcrystalline cellulose, polyvinylpyrrolidone, methylcellulose, water, alcohol and the like. The formulations can additionally include lubricating agents such as talc, magnesium stearate and mineral oil, wetting agents, emulsifying and suspending agents, preserving agents such as methyl- and propylhydroxybenzoates, sweetening agents or flavoring agents. Further, the compositions of the present invention can be formulated so as to provide quick, sustained or delayed release of the active ingredient after administration to a subject.

Parenteral formulations for use in accordance with the present invention are prepared using standard techniques in the art. They are commonly prepared as sterile injectable solutions, using a parenterally acceptable carrier such as isotonic saline solution or as a sterile packaged powder prepared for reconstitution with sterile buffer or isotonic saline prior to administration to a subject.

Those skilled in the art can now appreciate from the foregoing description that the broad teachings of the present invention can be implemented in a variety of forms. Therefore, while this invention has been described in connection with particular embodiments and examples thereof, the true scope of the invention should not be so limited. Various changes and modification may be made without departing from the scope of the invention, as defined by the appended claims.

What is claimed is:

1. A method of producing vegetation water from olives, said vegetation water containing oleuropein substantially free of monophenolic compounds from olive pits, comprising separating olive pits from olives to obtain a pitless olive pulp;

pressing the pitless olive pulp to obtain a liquid-phase mixture including water, oil, and olive pulp components;

separating the water component from the oil and olive pulp components of the liquid-phase mixture to obtain a water component substantially free of oil and olive pulp;

collecting the separated water component.

2. The method of claim 1, further comprising removing moisture from the water component to obtain an increased concentration of oleuropein.

3. The method of claim 1, further comprising drying the separated water component to obtain a powder containing oleuropein.

4. The method of claim 3, further comprising encapsulating the powder containing oleuropein into a gelatin capsule.

5. A composition prepared according to the method of claim 3 which comprises oleuropein substantially free of monophenolic compounds from olive pits.

6. A method for obtaining oleuropein from olives, substantially free of monophenolic compounds from olive pits, which comprises separating olive pits from olives to obtain a pitless olive pulp;

extracting the pitless olive pulp with an aqueous or aqueous-alcoholic solvent to produce a crude mixture of polyphenolic compounds in the extract;

removing the solvent from the extract.

7. The method of claim 6 further comprising chromatographing the extract on a column; and collecting fractions from the column, which contain oleuropein.

8. A dietary supplement, comprising extract of olives containing oleuropein substantially free of monophenolic compounds from olive pits.

9. The dietary supplement of claim 8, wherein said extract is an aqueous or aqueous-alcoholic extract.

10. The dietary supplement of claim 9, wherein said extract has a reduced moisture content to provide a concentrated liquid.

11. The dietary supplement of claim 9, wherein said extract is dried to provide a powder.

12. The dietary supplement of claim 11, wherein said extract is in the form of a tablet, capsule, pill, or confection food additive.

* * * * *